May 5, 1925.
A. FELTON
MOWER
Filed April 2, 1921
1,536,428
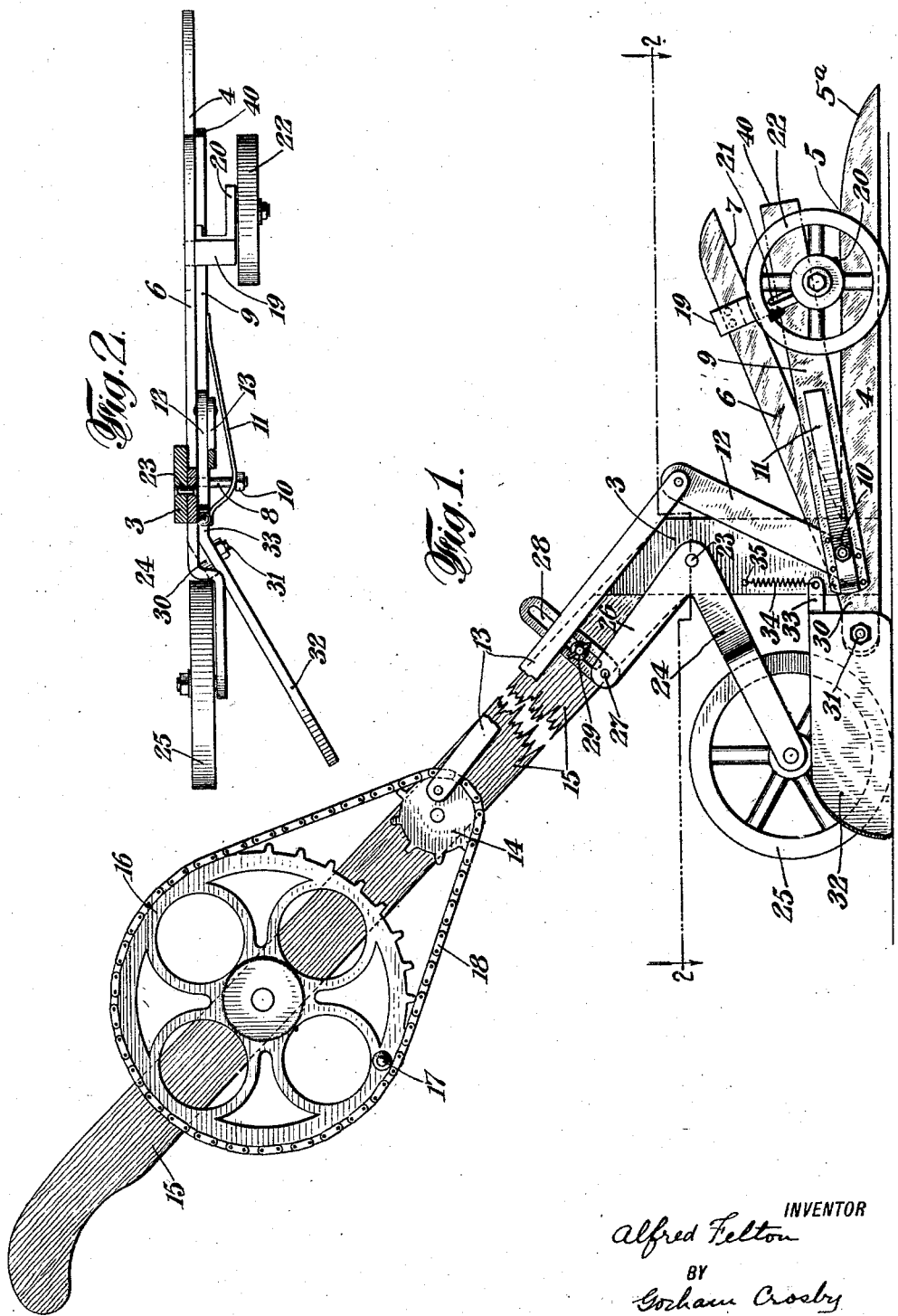
INVENTOR
Alfred Felton
BY
Gorham Crosby
ATTORNEY Patented May 5, 1925.

1,536,428

UNITED STATES PATENT OFFICE.

ALFRED FELTON, OF NEWBURGH, NEW YORK.

MOWER.

Application filed April 2, 1921. Serial No. 457,898.

*To all whom it may concern:*

Be it known that I, ALFRED FELTON, citizen of the United States, and resident of Newburgh, in the county of Orange and State of New York, have invented certain new and useful Improvements in Mowers, of which the following is a specification.

My invention relates to improvements in mowers and more particularly to mowers adapted to cut grass along the edges of a path, garden, etc. The main object of the invention is to provide a mower of this class which is not only simple in its construction but one which is also very efficient in operation. Further and more specific objects, features and advantages will more clearly appear from the detail description given below taken in connection with the accompanying sheet of drawings, which forms a part of this specification. In the drawings, Fig. 1 is a side view partly broken away of a mower embodying my improvements in a preferred form thereof. Fig. 2 is a section of the same taken on the line 2—2 of Fig. 1.

Referring to the drawings, 3 represents a suitable frame piece to which is rigidly secured a fixed lower knife 4 having a cutting edge 5 on its upper edge, and 6 represents a fixed upper knife having a cutting edge 7 on its underneath edge, the knife 6 being also secured to the frame piece 3 and arranged at an angle to the knife 4 as clearly shown in Fig. 1. Pivoted about a bolt 8 secured to the frame piece 3 adjacent the angle of intersection of the cutting edges of the upper knives 6 and 4, is a movable knife 9, and a nut 10 forces the two ends of a spring member 11 against the knife 9 so as to provide resilient means pressing the pivoted knife against the fixed knives at a point or points distant from the pivot 8 of the pivoted knife. Secured rigidly with the pivoted knife 9 is an arm 12 extending upwardly and having pivotally connected to its upper end a link 13 extending upwardly and rearwardly and eccentrically pivoted to a gear 14 rotatably mounted on a handle member 15 which is secured to the frame piece 3 and extends upwardly and rearwardly therefrom, and in a plane substantially parallel to the plane of the knives and also rearwardly therefrom. Also mounted on the handle member 15 is a larger gear 16 provided with a handle 17 by means of which the same may be manually operated, the gear 16 being adapted to drive the gear 14 at greater speed by means of a sprocket chain 18 so that upon manually turning the gear 16, the link 13 is reciprocated rapidly thereby causing the pivoted knife 9 to oscillate rapidly up and down and cooperate with the fixed knives 4 and 6 to cut off the grass as the mower is pushed ahead by hand. Secured to the upper knife 6 at its forward end is a bracket 19 having a downwardly extending arm 20 provided with a slot 21 in which is adjustably and rotatably secured a roller 22. By this arrangement the roller 22 is adapted to support the forward end of the mower and is spaced from the cutting knives so that it will not interfere with the grass entering between the cutting edges as the mower is pushed ahead and at the same time the roller 22 may be adjusted in heighth relative to the cutting knives as desired. Pivotally mounted to the frame piece 3 at 23 and so as to swing in a vertical plane is an arm 24 which extends rearwardly and downwardly and on the lower end of which is rotatably mounted a roller 25 adapted to bear on the ground and support the rear end of the mower. Integral with the arm 24 is an upwardly extending arm 26 to which is pivotally connected at 27 a slotted link 28 which has cooperating therewith a thumb screw 29 by means of which the position of the arms 24 and 26 may be held in adjusted position by setting up on the thumb screw 29 which operates on the handle member 15. The fixed knife 4 has a rearwardly extending portion 30 to which is pivoted at 31 a member 32. The member 32 extends rearwardly from and laterally at an angle to the operating plane of the knives as shown in Fig. 2 and has its lower edge substantially parallel to the ground and is provided with a forwardly extending arm 33 engaged by the lower end of a tension spring 34, the upper end of which is connected to the frame piece 3 at 35 so that the spring tends to pull up on the arm 33 and cause the body portion of the member 32 to be swung downwardly against the ground. By this arrangement, a member is provided which extends laterally to the plane of the knives and which acts to push cut grass away from the line of cut as the mower is moved forward, the spring 34 acting as resilient means causing the member to bear against the ground with a slight pressure.

The lower knife 4 lies close to the ground so as to pass under the grass and is substantially longer than the movable knife 9 and the pivoted knife 9 is also shorter than the upper fixed knife 6. Also the lower knife 4 is tapered off at 5ª at its upper edge so that its upper edge at its outer or forward end extends downwardly away from the pivoted knife 9. It will be understood that as the knife 9 is oscillated up and down, both its upper and its lower edge alternately cooperate with the knives 6 and 4 to cut the grass which is brought in therebetween as the mower is pushed ahead. Also the movable knife is of substantially uniform width throughout substantially its operative length and provided with a blunt outer end at 40. By having the pivoted movable knife blunt or square at its forward end or of substantially uniform width throughout its operative length, less movement thereof is required in order to complete the cut. Furthermore the knife is more rigid in construction thereby making it more efficient in its cutting operation. It does not readily bend away from the fixed knives at the forward end which would prevent the complete cut. The spring 11 also acts to keep the knife 9 resiliently pressed against the knives 4 and 6 and thereby take up any play which the knife 9 may have at its pivotal connection.

The wheels 22 and 25 are preferably arranged to track in the path, garden or the like, that is, on the lower level whereby the knives 4 and 6 are conveniently brought into position to collect therebetween the overhanging grass so that it may be readily cut by the oscillating knife 9. By hanging the front wheel from the upper fixed blade, the droppings of grass from the upper cut are free to fall direct to the ground, and by spacing the front wheel from the knives, ample space is given for the grass to enter without being obstructed by the wheel or roller 22. The middle or movable knife 9 is shorter or not longer than the upper fixed blade 6 so that it does not flip the grass up over the top of the knife 6 before it enters under the upper blade or knife 6.

By operating the movable knife 9 through the reciprocating link 13 and gears 14 and 16 on the outside of the handle 15, a simple and efficient manually operated means is provided whereby the knife 9 may be operated from the upper end of the handle member manually and independently of the movement of the mower. The sprocket wheel 14 is made considerably smaller than the sprocket wheel 16 in order that the wheel 14 may be driven at greater speed than the wheel 16 so that the oscillating of the knife 9 may be sufficiently rapid.

While I have described my improvements in great detail and with respect to a preferred form of the invention, I do not desire to be limited to such details and form since many changes and modifications may be made and the invention embodied in widely differing forms without departing from the spirit and scope of the invention in its broader aspects. Many of the novel features of the invention may be used without using others.

What I claim as new and desire to secure by Letters Patent, is:

1. A mower having in combination, a frame, a lower knife, an upper knife inclined to the lower knife, a pivoted movable knife cooperating with the upper and lower knives, the pivoted knife having a blunt end and the lower knife extending beyond the front end of the pivoted knife, a roller for supporting said knives, means for adjusting the height of said roller with respect to said knives, a handle member extending upwardly and rearwardly from said knives and manually operated gearing at the upper end of the handle member for oscillating said pivoted knife.

2. A mower having in combination, a frame, a lower knife, an upper knife inclined thereto, a pivoted knife cooperating with the upper and lower knives, the lower knife extending beyond the front end of the pivoted knife, a rear supporting roller for said knives, a supporting roller carried at the front end of the knives and lying in a plane at one side of the knives, a handle member extending upwardly and rearwardly from said knives, a manually operated hand wheel at the upper end of said handle member, a wheel driven at greater speed therefrom, and means for oscillating the pivoted knife from said last mentioned wheel.

3. A mower having in combination, a frame, a lower knife, an upper knife inclined thereto, a pivoted knife cooperating with the upper and lower knives, the lower knife extending beyond the front end of the pivoted knife, a rear supporting roller for said knives, carried at the rear of said knives, a supporting roller carried at the front end of the knives and lying in a plane at one side of the knives, a handle member extending upwardly and rearwardly from said knives, and manually operated means at the upper end of said handle member for oscillating the pivoted knife.

4. A mower having in combination, a frame, a lower knife, an upper knife inclined thereto, a pivoted knife cooperating with the upper and lower knives, the lower knife extending beyond the front end of the pivoted knife, a rear supporting roller for said knives carried at the rear of said knives and lying substantially in the plane of said knives, a supporting roller carried at the front end of the knives and lying in a plane at one side of the knives, a handle member extending upwardly and rearwardly from said knives, a manually operated handwheel at the upper end of said handle member, a wheel driven a greater speed therefrom, and means for oscillating the pivoted knife from said last mentioned wheel.

5. A mower having in combination, a frame, a lower fixed knife, an upper fixed knife, a movable knife cooperating with said fixed knives, a supporting roller carried at the forward end of said knives and spaced laterally therefrom and means for operating the movable knife.

6. A mower having in combination, a frame, a lower knife, an upper knife inclined thereto, a pivoted knife cooperating with the upper and lower knives, the lower knife extending beyond the front end of the pivoted knife, a rear supporting roller for said knives, carried at the rear of said knives and lying substantially in the plane of said knives, a supporting roller carried at the front end of the knives and lying in a plane at one side of the knives, a handle member extending upwardly and rearwardly from said knives, a manually operated handwheel at the upper end of said handle member, a wheel driven a greater speed therefrom, means for oscillating the pivoted knife from said last mentioned wheel, and means for adjusting the height of both of said rollers with respect to said knives.

7. A mower having in combination, a frame, a lower knife, an upper knife inclined thereto, a pivoted knife cooperating with the upper and lower knives, the lower knife extending beyond the front end of the pivoted knife, and said lower knife being tapered off on its upper edge so that its upper edge at its forward end extends downwardly away from the pivoted knife, a rear supporting roller for said knives carried at the rear of said knives, a supporting roller carried at the front end of the knives and lying in a plane at one side of the knives, a handle member extending upwardly and rearwardly from said knives, and manually operated means at the upper end of said handle member for oscillating the pivoted knife.

8. A mower having in combination, a frame, a lower knife, an upper knife inclined thereto, a pivoted knife cooperating with the upper and lower knives, the lower knife extending beyond the front end of the pivoted knife, a rear supporting roller for said knives, a supporting roller carried at the front end of the knives and lying in a plane at one side of the knives, a handle member extending upwardly and rearwardly from said knives, a manually operated handwheel at the upper end of said handle member, a wheel driven a greater speed therefrom, means for oscillating the pivoted knife from said last mentioned wheel, and a member extending rearwardly from and laterally at an angle to said knives for pushing cut grass away from the line of cut.

9. A mower having in combination, a frame, a lower knife, an upper knife inclined thereto, a pivoted knife cooperating with the upper and lower knives, the lower knife extending beyond the front end of the pivoted knife, a rear supporting roller for said knives, carried at the rear of said knives and lying substantially in the plane of said knives, a supporting roller carried at the front end of the knives and lying in a plane at one side of the knives, a handle member extending upwardly and rearwardly from said knives, a manually operated handwheel at the upper end of said handle member, a wheel driven at a greater speed therefrom, means for oscillating the pivoted knife from said last mentioned wheel, and a member extending rearwardly from and laterally at an angle to said knives for pushing cut grass away from the line of cut, said last mentioned member being pivoted and having its lower edge substantially parallel to the ground.

10. A mower comprising a frame, an upper knife and a lower knife and a relatively movable knife cooperating with said upper and lower knives, supporting rollers for said knives, a handle bar extending upwardly and rearwardly from said roller and knives, manually operated means carried at the upper end of the handle for operating the movable knife, and means for independently adjusting the height of both of said rollers with respect to said knives.

Signed at Newburgh, in the county of Orange and State of New York, this twenty-ninth day of March A. D. 1921.

ALFRED FELTON.